United States Patent [19]
McKearney

[11] Patent Number: 6,035,298
[45] Date of Patent: Mar. 7, 2000

[54] ACCESSING PLURAL INDEPENDENT DATABASES HAVING PLURAL DATABASE SCHEMAS

[75] Inventor: Stephen McKearney, Bournemouth, United Kingdom

[73] Assignee: British Telecommunications public limited company, London, United Kingdom

[21] Appl. No.: 09/043,644
[22] PCT Filed: Oct. 18, 1996
[86] PCT No.: PCT/GB96/02572
 § 371 Date: Mar. 25, 1998
 § 102(e) Date: Mar. 25, 1998
[87] PCT Pub. No.: WO97/15017
 PCT Pub. Date: Apr. 24, 1997

Related U.S. Application Data

[63] Continuation-in-part of application No. 08/609,044, Feb. 29, 1996, abandoned.

[30] Foreign Application Priority Data

Oct. 19, 1995 [EP] European Pat. Off. .............. 95307469

[51] Int. Cl.[7] ..................................................... G06F 17/30
[52] U.S. Cl. ............................. 707/10; 709/217; 345/326
[58] Field of Search ..................................... 707/1–4, 103, 707/9, 10; 395/200.47, 200.48, 200.49, 200.33; 345/326, 329, 330, 331, 335, 341; 713/200–202; 709/200, 201, 203, 217–219

[56] References Cited

U.S. PATENT DOCUMENTS

| | | | |
|---|---|---|---|
| 5,649,186 | 7/1997 | Ferguson ................................... | 707/10 |
| 5,655,116 | 8/1997 | Kirk et al. .................................. | 707/1 |
| 5,692,181 | 11/1997 | Anand et al. ............................. | 707/102 |
| 5,737,592 | 4/1998 | Nguyen et al. .............................. | 707/4 |
| 5,748,188 | 5/1998 | Hu et al. .................................... | 345/326 |
| 5,761,656 | 6/1998 | Ben-Shachar ................................. | 707/4 |

OTHER PUBLICATIONS

Dunlop et al, "Providing Access to a Multimedia Archive Using the World Wide Web and an Object–Relational Database Management System", Database Management, Computing & Control Engineering Journal, Oct. 1996, pp. 221–226.

Singleton, "Wired on the Web", BYTE, Jan. 1996, pp. 77–78, 80.

Tanaka, "Adding Methods to Relational Database Constructs" 0730/3157/0000/0042/$01.00, 1991, IEEE.

Obraczka et al, "Internet Resource Discovery Services", Computer, 26 (1993) Sep., No. 9, Las Alamitos, CA, US, pp. 8–22.

Hahn, "Uniform Resource Loctors", EDPACS, Dec. 1995, pp. 8–13.

Lie, "World–Wide Web Technology" Proceedings, CERN European Organization for Nuclear Research, 1995 CERN School of Computing, Aug. 20–Sep.2, 1995.

Fisher, "Along the Infobahn" Data Warehouses, Third Quarter, 1996.

Computing & Control Engineering Journal, vol. 7, No. 5, Oct. 1996, pp. 221–226, Dunlop et al, "Providing Access to a Multimedia Archive Using the World Wide Web and an Object–Relational Database Management System".

BYTE, vol. 21, No. 1, Jan. 1, 1996, p. 77/78, Singleton, "Wired on the Web".

Computer, vol. 26, No. 9, Sep. 1, 1993, pp. 8–22, Obraczka et al, "Internet Resource Discovery Services".

"Link the Web with Your Relational Databases," Guiterrez, Dan D., Data Based Advisor, v13, n7, p94(2), Aug. 1994.

*Primary Examiner*—Hosain T. Alam
*Attorney, Agent, or Firm*—Nixon & Vanderhye P.C.

[57] ABSTRACT

A remote database is accessed from user terminals. A communication channel is established over the World Wide Web and commands defining a user interface are returned from the database system to the user terminals. The database system supplies an indication of quantifiable values to the user terminals inviting a user to select one of the values. An indication of a selected value is supplied to the database system resulting in an indication being returned of available data mappings. A data mapping is selected by user and an indication of a elected mapping is supplied to the database. In response to this indication, an inquiry is made by activating database-specific instructions defined by Standard Query Language.

18 Claims, 10 Drawing Sheets

| REGION | ADVERTISING COSTS | |
|--------|-------------------|--|
| NW | 1000 | |
| NE | 2000 | |
| N | 1500 | |
| W | 600 | |
| SE | 800 | |

Figure 3A

| CUSTOMER ID | SALE | PRODUCT ID |
|-------------|------|------------|
| 123 | 20 | 14B |
| 478 | 75 | 76A |
| 147 | 80 | 159C |
| 532 | 45 | LDD14 |
| 649 | 120 | H5H |
| 864 | 450 | 773I |
| 497 | 720 | H5H |
| 497 | 120 | 14B |
| 381 | 40 | H5H |
| 315 | 75 | 14B |
| | | |

Figure 3B

| CUSTOMER ID ⟨306 | ADDRESS ⟨307 | CITY ⟨308 | CUSTOMER TYPE ⟨309 |
|---|---|---|---|
| 1 | — | LONDON | B |
| 2 | — | LONDON | B |
| 3 | — | BROMLEY | B |
| 4 | — | SHEFFIELD | P |
| 5 | — | NEWBURY | P |
| 6 | — | OXFORD | P |
| 7 | — | ROTHERHAM | P |
| 8 | — | LEICESTER | B |
|  |  |  |  |

Figure 3C

| CITY ⟨310 | REGION ⟨311 |  |
|---|---|---|
| BROMLEY | SE |  |
| LEICESTER | E |  |
| SHEFFIELD | N |  |
| OXFORD | SE |  |
| CAMBRIDGE | SE |  |
|  |  |  |

|  | SALES 879583 | REGION — | EXPENDITURE 15 900 |
|---|---|---|---|
|  | 25 023 | NW | 1000 |
|  | 150 720 | NE | 2000 |
|  | 80 525 | N | 1500 |
|  | 50 840 | W | 600 |
|  | 572 475 | SE | 800 |
|  |  | 6 |  |

Figure 9

ACCESSING PLURAL INDEPENDENT DATABASES HAVING PLURAL DATABASE SCHEMAS

RELATED APPLICATION

This is a continuation-in-part of my commonly assigned U.S. application Ser. No. 08/609,044, filed Feb. 29, 1996, now abandoned.

FIELD OF THE INVENTION

The present invention relates to accessing relational database systems from remote terminals.

BACKGROUND OF THE INVENTION

Distributed data access systems are known that require a central authority responsible for defining a rigid set of conventions, known as a global schema, to control the way in which data is structured and represented at the various sites that make up the system. The existence of the global schema restricts the autonomy of the local sites and results in rigidity and delay with regard to when and how data is stored and accessed.

A simple database system which may be accessed remotely is described in GB 1581136, which describes an information handling system and terminal apparatus. Information may be displayed as an index and selections may be made by operators by operation of a keypad to indicate which item of a displayed index is required.

The system effectively describes an arrangement of linked flat pages where a selection made on the top level page will result in a lower level page being supplied to a user.

The database structure of this type only allows pre-stored information to be supplied to users.

The present invention is directed towards the problem of accessing central relational database systems, where database specific commands are required to be activated in response to local selections. These types of commands may involve complex filtering combining and displaying commands so as to derive optimum benefit from relational databases containing a plurality of tables. In the aforesaid known system, no provision is made for activating commands of this type, given that all data supplied to users is predefined. Such an arrangement would therefore have serious limitations when access is to be provided to relational databases.

When users are given direct access to relational databases, highly sophisticated commands, usually defined using Standard Query Language (SQL) may be directed at the database. These may cause undesirable operations to be effected upon the database which may corrupt data or, more likely, may consume significant amounts of processing time as re-indexing operations are performed. It is therefore desirable to provide the power of relational database environments while at the same time providing a level of restriction upon the extent to which some users may be given access to certain procedural systems.

SUMMARY OF THE INVENTION

According to a first aspect of the present invention, there is provided a method of producing output data from a database system in response to instructions from distributed user terminals, comprising steps of establishing a communications channel between a user terminal and said database system; supplying data from said database system to said connected user terminal to identify available relational data queries; returning data to said database system identifying a selected relational data query from said available selection; and implementing said selected query to produce output data from said database.

In a preferred embodiment, database specific instructions are defined in accordance with Standard Query Language (SQL) instructions and said SQL may be generated by the execution of a predefined script.

Preferably, a user interface environment is established in response to commands returned from the remote database and the remote database may supply indications of available quantifiable values.

According to a second aspect of the present invention, database apparatus are provided configured to produce output data in response to instructions from distributed user terminals, comprising means for establishing a communication channel with a user terminal; means for supplying data to said connected user terminal to identify available relational data queries; means for receiving data identifying a selected relational data query from said available selection; and means for implementing said selected query to produce output data.

DETAILED DESCRIPTION OF THE PREFERRED EMBODIMENTS

Figure 1:
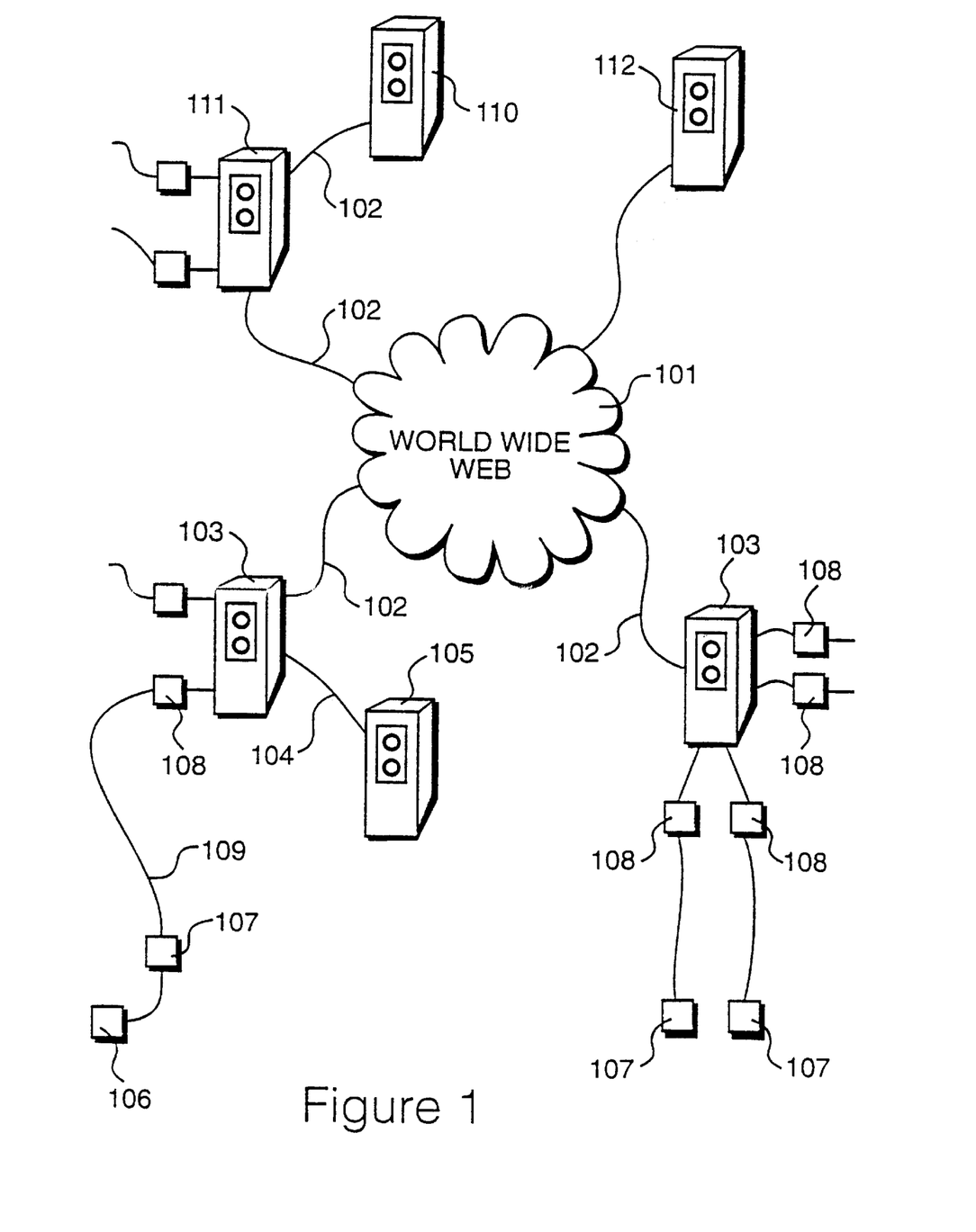
FIG. 1 is a diagrammatic representation of the international distribution network known as the world wide web, forming part of the internet; having local user sites and remote databases connected thereto.

International data communication is provided by the world wide web, illustrated diagrammatically as region 101 in FIG. 1. Access to this network is provided over data channels 102, that are in turn connected to service nodes 103. The service nodes 103 allow users to gain access to the world wide web, and other internet facilities, with varying levels of transmission bandwidth.

In accordance with established protocols, messages are addressed so as to identify a particular destination point by means of data defining a uniform resource location (URL).

URLs of this type may be generated manually by an operator, or, alternatively they may be generated automatically as programs are executed.

Under the world wide web, pages of data are supplied to users in a structured form, specified using "hyper-text mark-up language" (HTML) and servers of this type are identified as operating in accordance with "hyper-text transport protocol" (HTTP). Thus, in accordance with established world wide web operation, it is possible for a local user to obtain information from a displaced site by issuing a URL over the world wide web. In response to receiving a URL, an HTTP server may issue a formatted HTML page to the requesting user, thereby allowing information to be displayed to the user in a structured way. Furthermore, in addition to data of this type being supplied to users, it is also possible for executable programs to be supplied to users, identified as "common gateway interface binary" programs (CGI.BIN programs) so as to further enhance the functionality of the interactive world wide web environment.

A recent development has extended the functionality of world wide web connections using CGI.BIN type programs. A proprietary system is available from SUN Microsystems licensed under the trademark "JAVA". In accordance with this environment, it is possible for JAVA code to be supplied to local requesting users in a form that is executable on the local station so as to provide an operational environment, similar to that provided by an applications program, without requiring local users to obtain application instructions from independent sources. Thus, it is possible for local users to be given enhanced functionality similar to that provided by an applications program, without being required to load local programs, possibly from floppy disks etc., given that these programs are effectively provided over the network connection.

A session may be initiated by a local user requesting access to a remote station, whereafter, embedded within an HTML page, JAVA code is supplied back to the requesting user such that an application program is effectively loaded into local memory. The user may then interact with that application, allowing transactions to be made over the network, effectively under the control of the remote station. A platform of this type is used within the present embodiment in order to provide remote access to databases and to allow database queries to be made.

Standard query language is widely used, usually referred to as SQL, configured to allow queries to be made to many different proprietary database systems. Predominantly, these consist of relational databases but similar techniques may be employed with flat file databases and object orientated databases etc. Usually, a database in combination with a terminal or terminals for providing access to said database, would be considered as an isolated self-contained system, where the data volume and the type of enquiries that can be made to that volume remain substantially constant. Networks of databases of this type are known, but in existing systems it is necessary to construct such databases from common starting points so as to ensure compatibility between the remote locations. In the art, such an approach is known as a global schema.

If a schema has not been adopted for the development of independent databases, it is very difficult to combine data accessed from different locations. Thus, in existing systems, it may be necessary to effectively reformat data obtained from one database for its application to a second database or, alternatively, it may be possible for experienced programmers to develop bespoke SQL enquiries thereby facilitating the integration of the databases to some extent. Clearly, it can be appreciated, that the development of systems of this type requires a substantial level of expertise of the database itself and access to it become several layers removed from executives and managers who may require queries to be implemented such that commercial decisions may be effected. Thus, in many situations, although data required by a particular manager may effectively have been recorded in a database or a collection of databases, the process of actually gaining access to the data and collating the data becomes a major exercise.

The present invention provides a technical process for facilitating an interaction with databases such that much of the technical burden is taken by the machines constituting the network, thereby allowing managers and executives to gain easy access to a consistent, substantially intuitive platform.

In the present embodiment, in accordance with the present invention, database systems include database specific commands contained as sets of commands or program files which may be stored at the remote databases or constructed at said remote database when required. The essential feature of databases is that they facilitate data mappings such that data of a first type may be associated with data of a second type. For example, a customer may be identified with a unique customer identification. This would often make up the primary key in database systems such that all associated data within a particular table would be indexed to this key; given the identification number other data can be retrieved extremely quickly without performing resource-demanding searches.

Associated with this entry, other data may be included, such as a customer's name, address, post code, number of telephone lines, equipment requirements, customer age, date of installation and so on. Similarly, another table or another database may include on-going account information associating the customer's identification with financial details relating to the customer's account. Thus, in this second table, fields may exist identifying the amount of the customer's last bill, the extent of any discounts given to that customer, a credit rating for that customer, an indication of the customers history of bill payments and so on.

The customer identification is unique and by aligning customer identification with customer name on the first table, it is possible to relate this to a second table that maps customer identification to financial details. Thus, a relational link may be provided between customer names and amount outstanding, although this actual mapping does not exist in any one table. This approach forms the basis for relational databases.

In accordance with the present invention, each remote database contains a directory identifying particular mappings that may be provided by that database. A user may wish to relate data of type A to data of type C. The database may be capable of mapping data of type A to data of type B. In addition, another database may be capable of mapping data of type B to data of type C. Thus, by combining these two mappings, it is possible for a user to obtain the type of mapping that is required, ie. a mapping data of type A to data of type C, via the facility of an intermediate mapping using data of type B.

In addition to providing an indication of the type of mappings that are available within a database, the database also includes mechanisms for activating database specific commands so that the data may be examined as required by a user. The user is now capable, from a local station, of making effective database enquiries at the remote database, without requiring detailed information concerning the way in which SQL enquiries must be configured for that particular database. A communication channel is established between the user's terminal and the database system. In the preferred embodiment, this consists of the terminal issuing a URL to the database system, which in turn results in JAVA code being supplied back to the user which, when executed at the user's terminal, results in an application-type environment being provided to the user so as to facilitate further interaction with the remote database system.

Within this environment, the user is encouraged to select a data mapping and once selected, an indication of this mapping is supplied to the remote database. In the embodiment, the user's environment has been provided by JAVA instructions, therefore the data sent back to the remote database will again be in a form consistent with the known JAVA protocols. These protocols identify specific program files within the remote database which, in the present embodiment, are defined under the interactive language PERL. When selected, a PERL program is executed, resulting in the generation of an SQL enquiry specific to the particular database concerned. Alternatively, SQL enquiries may be stored and selected as required. In either event, the process involves the activation of a database specific command at the database systems, in response to user selection, resulting in appropriate information being supplied back to the local requesting users.

An Oracle relational database is retained on a database computer 110 and access to this database computer is provided via a remote network computer 111 having a connection to the world wide web 101. A local user terminal 112 is connected to the world wide web 101 and is thereby given access to the remote database computer 110.

The remote network computer 111 executes program instructions licensed by Sun Microsystems Inc. under the trademark "JAVA". JAVA code is embedded within HTML pages supplied to the local user terminal 112 so as to effectively provide an application program to the local terminal allowing it to gain access to the remote database 110. Thus, the extent to which local users may gain access to the remote database is constrained to operations that are facilitated within the JAVA environment. In this way, database suppliers retain a level of control as to how users may exploit the information available from their database.

Figure 2:
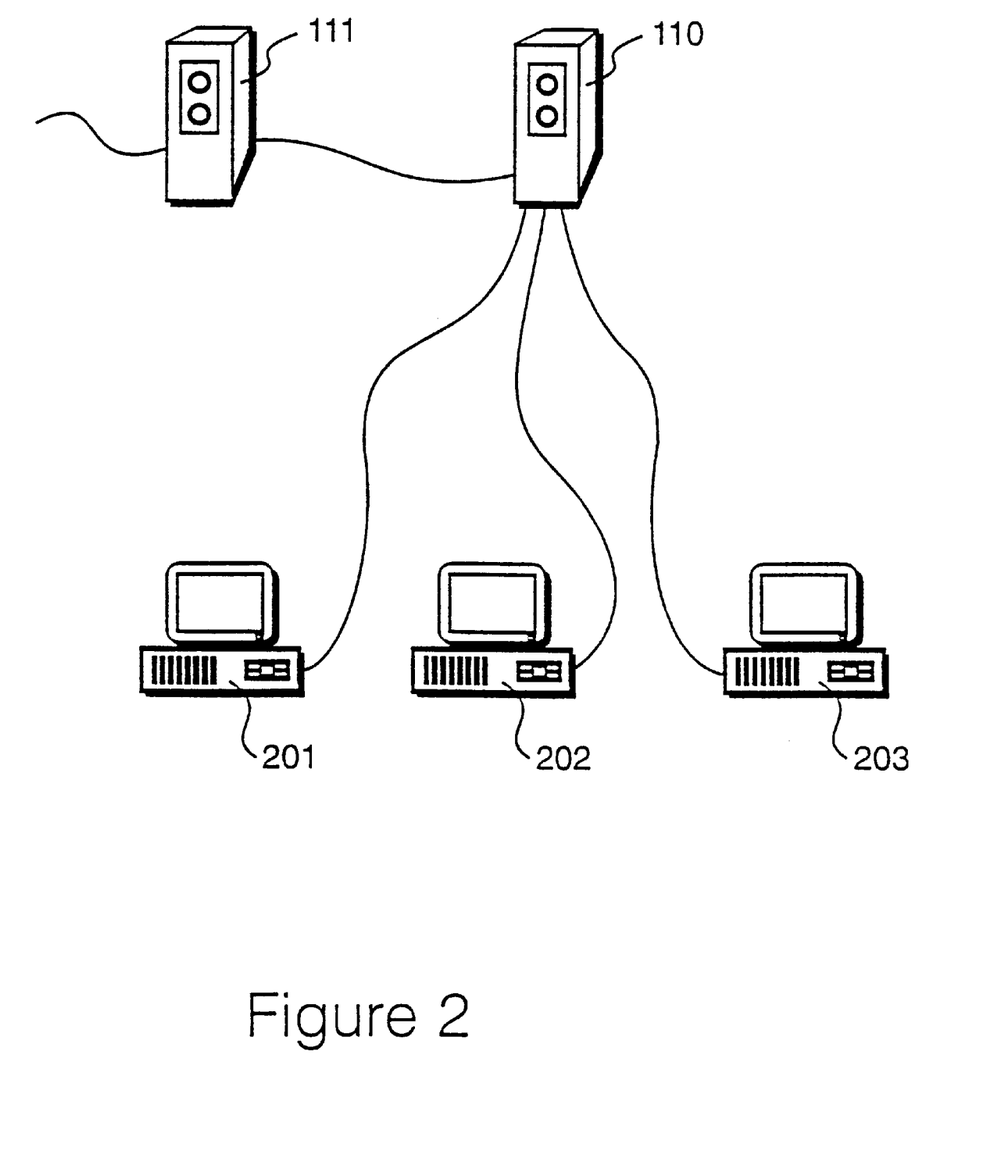
FIG. 2 details a remote database of the type shown in FIG. 1, having a database computer and a network access computer.

The remote site, consisting of computers 110 and 111 is shown in FIG. 2. Computer 110 essentially provides a conventional database environment allowing direct connection of associated terminals 201, 202, 203 etc. The database retained on database computer 110 is a relational database, comprising a plurality data tables of the type illustrated in FIGS. 3A, 3B, 3C and 3D.

As is well known in the art, many different types of data may be retained within relational databases and they have been found particularly useful for holding information relating to customers and suppliers for example, where the type of information required concerning each customer tends to be substantially similar. It is also possible for computer 110 to gain access to other computers using proprietary Oracle protocols, thereby effectively extending the range of tables that may be considered within the relational environment.

In the present example, it is assumed that a telecommunications organisation has recently invested in a promotional campaign in an attempt to increase network usage. Although a national campaign, the degree of marketing expenditure has been considered on a regional basis and a database has been created, illustrated in FIG. 3A, in which figures for advertising costs displayed in column 301, have been mapped against geographical regions identified in column 302. This database has been created as a result of the promotional campaign and retains a record of levels of expenditure, made on a region by region basis. The database also includes basic arithmetic functions, similar to those provided within conventional spreadsheet environments, allowing columns of figures to summed, thereby effectively providing totals of costs over a plurality of geographical regions.

Figure 3A:
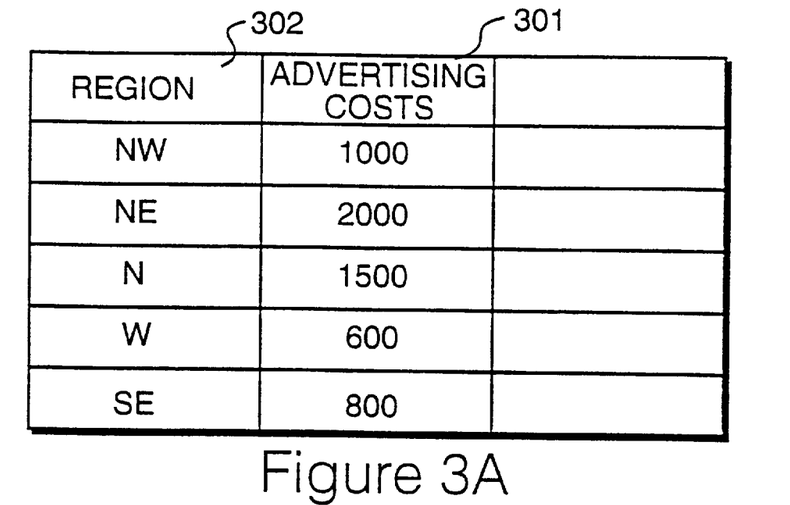
FIGS. 3A, 3B, 3C and 3D illustrate database tables of the type stored on the database computer shown in FIG. 2.

The information retained in the database table shown in FIG. 3A has its uses, but significantly more benefit may be gained from this information if it can be related to customer sales, thereby effectively demonstrating the effectiveness of the marketing campaign.

Figure 3B:
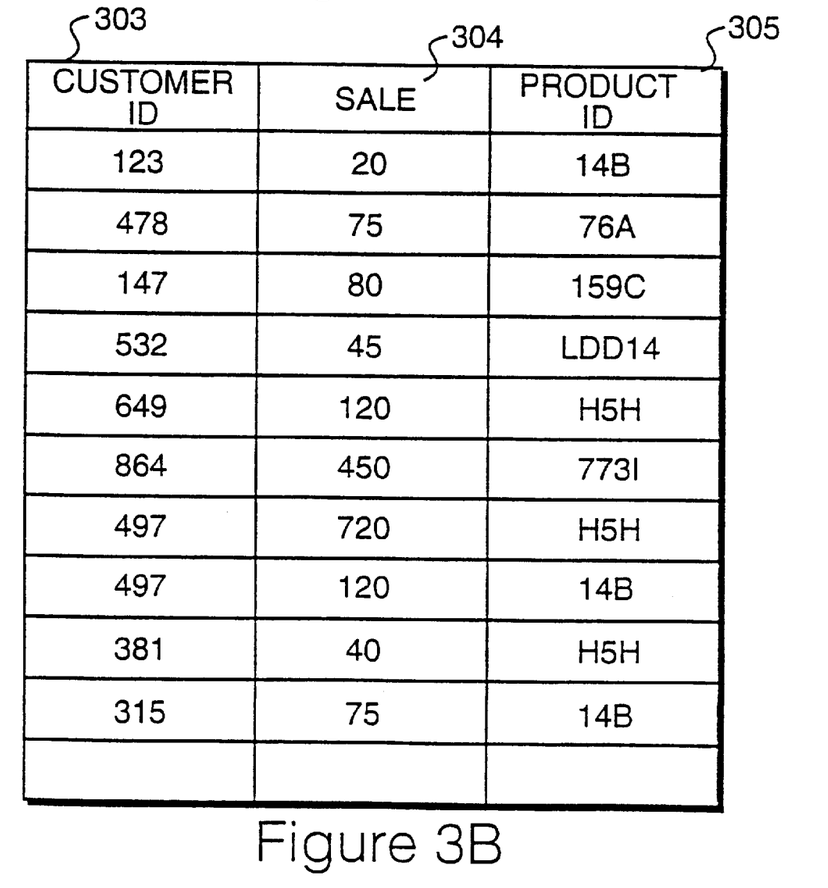

A second database retains information relating to product sales and a third database includes information relating to customers. A table for recording product sales is illustrated in FIG. 3B. When a sale is made, a customer identification is entered in column 303, followed by the value for the sale being added in column 304 and a product identification being placed in column 305. A table of this type may be constructed over a pre-determined time duration, thereby the total values accrued in column 304 gives a figure for the total sales made during that period. However, each sale in the table is only mapped against a customer identification and a product identification, therefore, it is not possible, using this table, to divide sales on a regional basis.

Figure 3C:
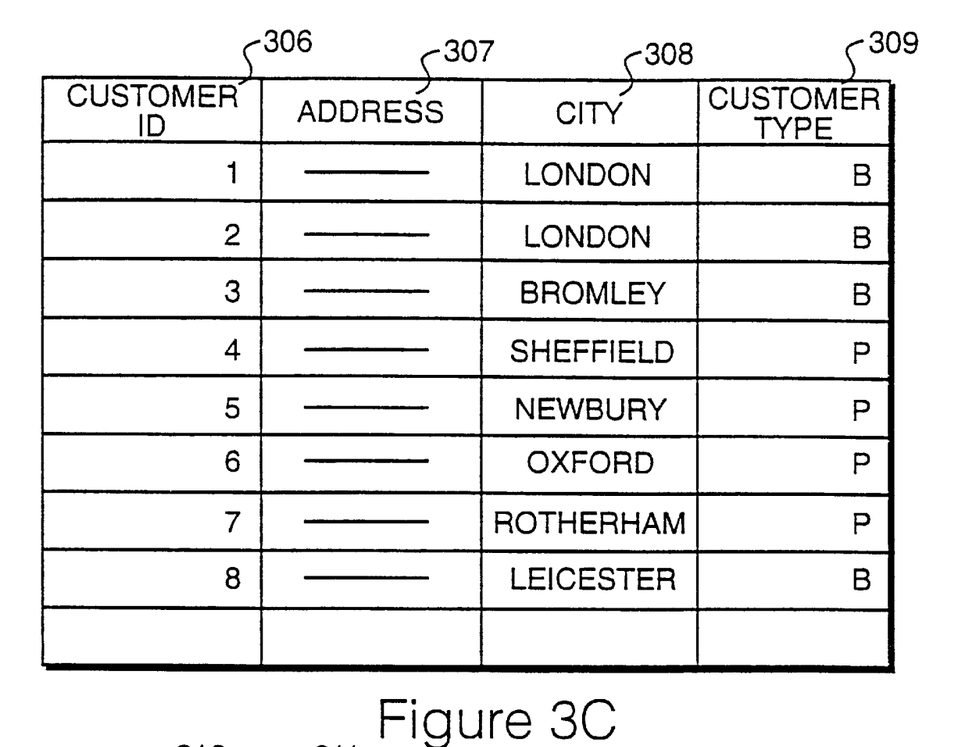

A third database contains information relating to customers and a table from this database is illustrated in FIG. 3C. For each customer, identified by the customer's identification number in column 306, an address is specified in column 307, including a city in column 308 and a customer type (business or private) in column 309. In order for customers to be considered on a regional basis, this database includes a second table, illustrated in FIG. 3D in which each city is entered in a column 310 with its corresponding geographical region specified in column 311.

From the table shown in FIG. 3B, it is possible to derive sales values on a customer by customer basis. This table may then be related to that shown in FIG. 3C allowing the customer-by-customer based figures to be converted to city-by-city based figures. Similarly, this data may then be related to the table shown in FIG. 3D so as to show total sales on a region-by-region basis. Thus, by relating the tables shown in FIGS. 3B, 3C and 3D, a mapping of total sales on a region by region basis may be derived, which could then be compared to advertising costs derived from the data shown in table 3A, that is also recorded on a region-by-region basis.

Figure 3D:
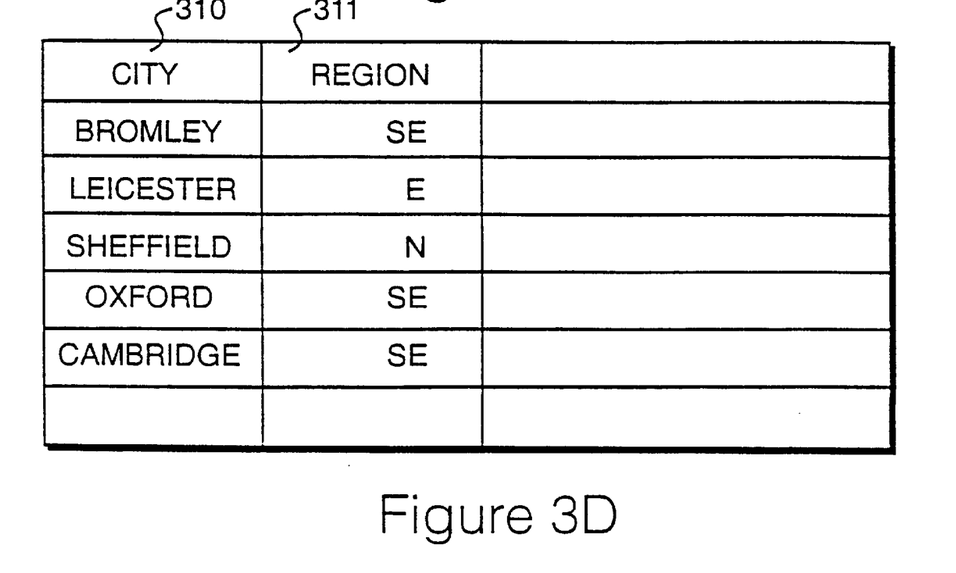

Enquiries for relating the information contained in tables 3B, 3C and 3D are well known in the art and are generally constructed using the SQL language. However, the extent to which this language may be used within a particular environment depends upon the structure of the data contained within that environment. In known systems, it would not be possible for local users to gain access to remote databases unless they had an in depth knowledge of the database structure. However, in the present embodiment, remote access is achieved by effectively inviting a local user to make requests within an environment defined by the remote system.

Figure 4:
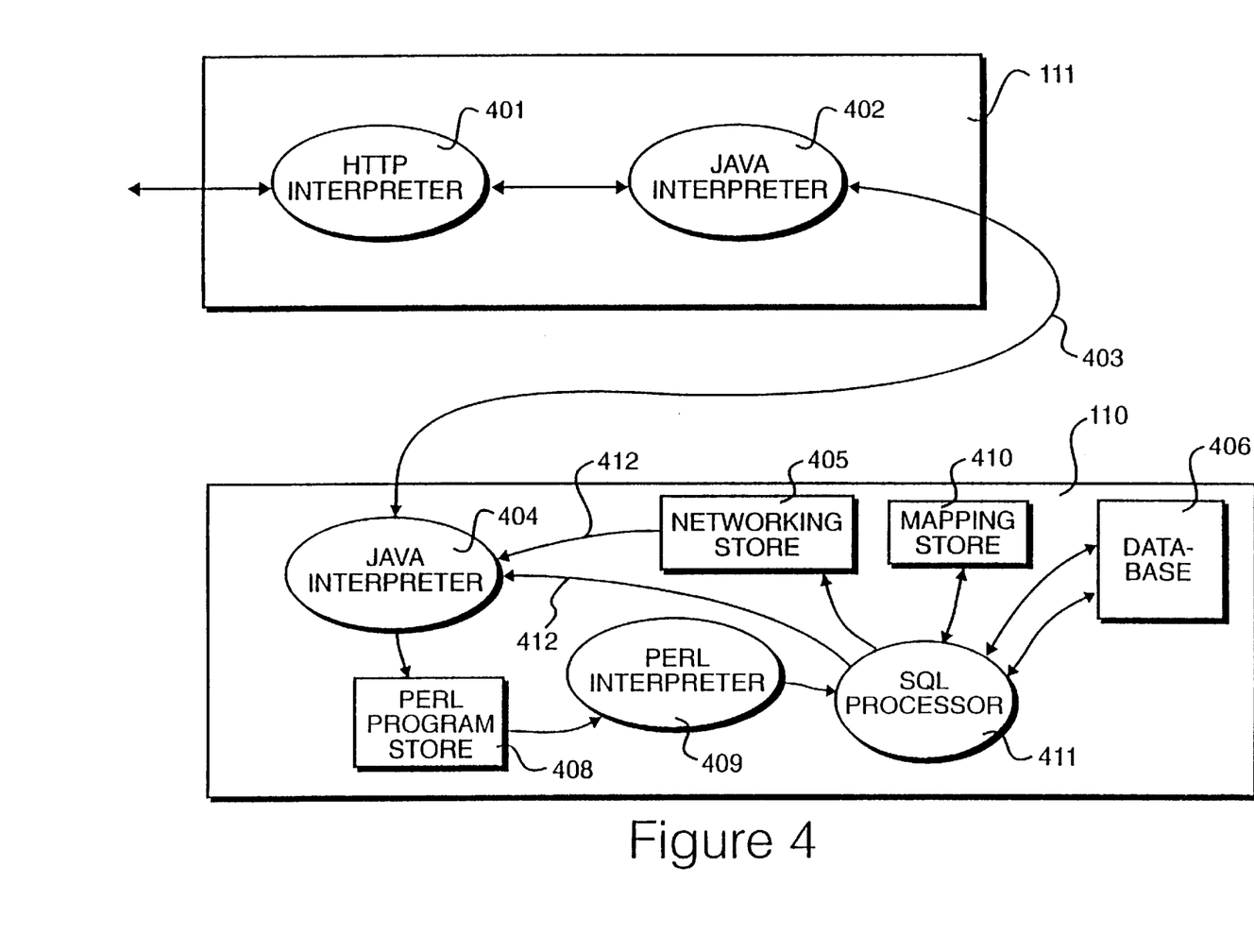
FIG. 4 details equipment contained within the database computer shown in FIG. 2 and illustrates processes executed by said computer.

To initiate a session, a local user issues a URL from their local user terminal 112 to the remote network computer 111, via the local user terminal 112. The URL is received by the remote network computer 111 and processed to provide access to the remote database computer 110. Operational functionality of the remote network computer 111 and the remote database computer 1 10 are illustrated in FIG. 4. A session initiating URL is received by an HTTP interpreter 401, which in turn relays a request to a JAVA interpreter 402. The JAVA interpreter 402 determines whether the requesting user may be given access to the system and once so determined, HTML pages are returned to the HTTP interpreter 401 having executable code (in the form of CIG.BIN programs) embedded therein. The HTTP interpreter 401 dynamically assembles appropriate HTML pages and directs these via the world wide web 101 to the requesting local user via their respective terminal, such as local terminal 112.

At the local terminal the HTML page is received and the JAVA codes embedded within the HTML pages are effectively loaded into the local memory of the local user terminal for local execution therein, in a way substantially similar to that performed when local application programs are executed. The execution of this JAVA code results in a graphical user interface being displayed at the local user terminal 112 in a form which allows the local user to access the remote database and to perform operations upon said database. However, the environment does not allow a user to supply SQL or similar enquiries. The environment allows particular types of operations to be performed on the basis that enquiry programs are already available to the remote site. Thus, the graphical user interface supported by the JAVA code effectively allows a user to select pre-defined SQL instructions such that all actual enquiries to the database are made using SQL enquiries held under the control of the remote database station.

A local user interacts with the graphical user interface defined by the JAVA code resulting in further URLs being supplied to the HTTP interpreter 401 via the world wide web 101. At the HTTP interpreter 401 the embedded JAVA instructions are derived that are, in turn, supplied to the JAVA interpreter 402. The JAVA interpreter 402 communicates via an ethernet link 403, with a JAVA interface module 404 executed by the database computer 110. Thus, the graphical user interface provided for local users is initially created under instructions derived exclusively from the remote network computer 111. In a network including a plurality of database computers, their associated remote network computer will be substantially similar to computer 111 and provide substantially similar graphical user interfaces. Thus, initially, the graphical user interface merely provides a "desktop" upon which specific database-related values and dimensions may be manipulated.

In order for the data contained within the remote database to be manipulated under the control of the local access, it is necessary for local user terminals to be provided with an indication of the nature of the data that is available within the remote database. The database computer 110 is therefore provided with a networking store 405 containing database metadata, that is data about the data contained within the database. Thus, when a connection is first established between the JAVA interpreter 402 and the JAVA interface 404, in response to a local user request, information from the networking store 405 is supplied to the JAVA interface and relayed to the JAVA interpreter 402. The JAVA interpreter 402 packages the information for embedding within an HTML page and the construction of the HTML page is made under the control of the HTTP interpreter (or Daemon) 401. The HTTP Daemon 401 supplies the HTML page to the local terminal via the world wide web so that, when received, the JAVA code is identified and used to provide the user with a graphical representation of the data derived from the networking store 405, representing the structure of the actual data contained within the database. The data contained within the database 406 may be considered as being contained in the form of tables.

After the meta-data from the networking store 405 has been supplied to a local user and displayed within the graphical user interface, it is then possible for the local user to perform operations upon the remote database. All operations performable upon the data contained with the database 406 are specified by respective enquiry programs defined using the language PERL. The PERL programs are stored within a PERL program store 408 and a selected PERL program is supplied to a PERL interpreter 409 that is arranged to execute the PERL instructions and thereby generate SQL queries. In this way, it is possible to define enquiries in a platform independent way with appropriate PERL interpreters being provided so as to generate SQL instructions in a form that is appropriate for the particular platform being used.

SQL instructions generated by the PERL interpreter 409 are supplied to an SQL processor 410 arranged to execute the SQL instructions and thereby perform operations upon the database 406. As requests are made by the local user, SQL instructions will be executed by the SQL processor 410 resulting in particular mappings of data entries being examined within the database 406. In order that meaningful data may be returned back to the requesting local user, the system maintains a record of the actual mappings that have been requested and this list of mappings is retained within a mapping store 410.

Figure 5:
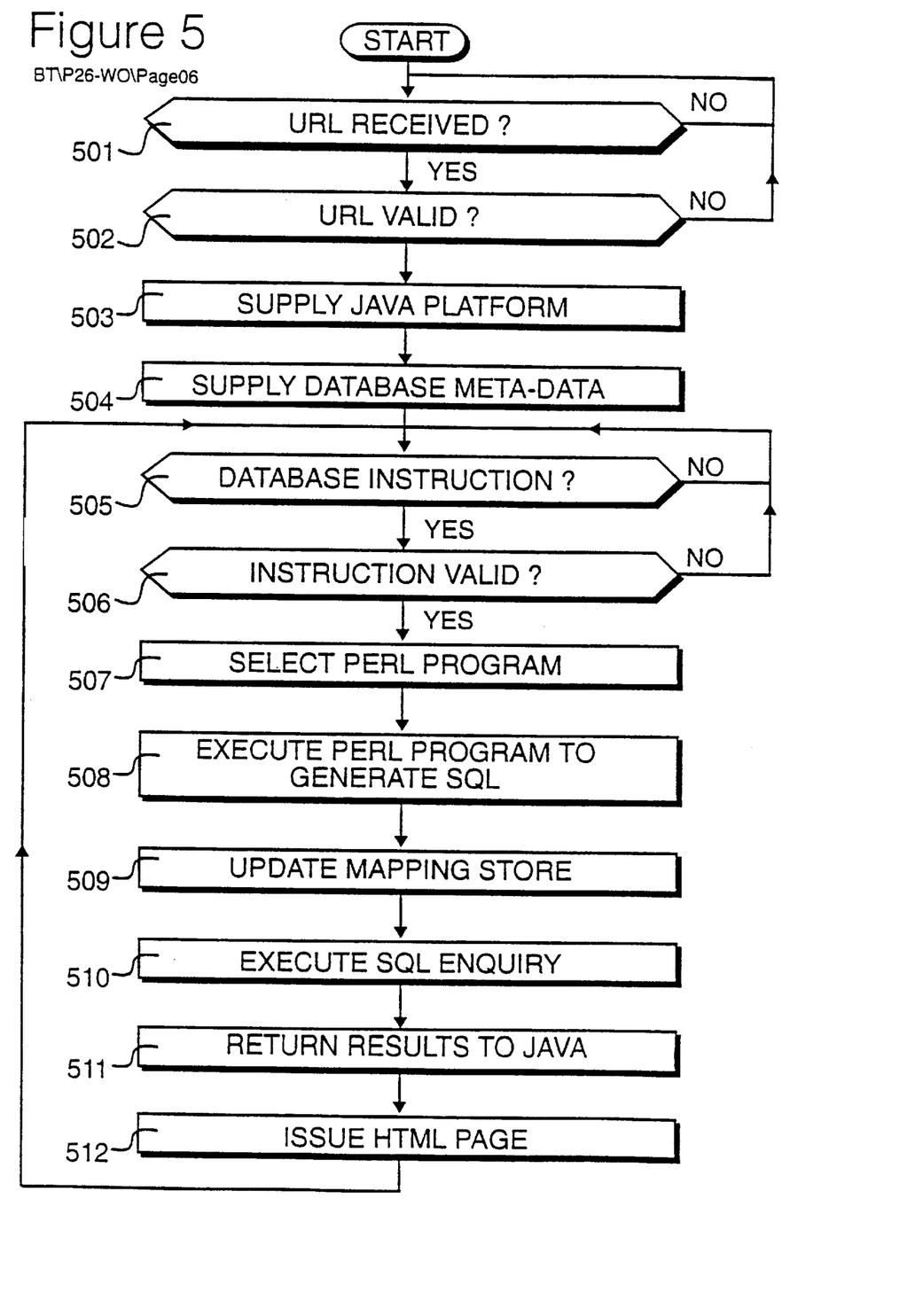
FIG. 5 illustrates procedures executed by the equipment shown in FIG. 4.

Operations executed within the environment shown in FIG. 4 are illustrated in FIG. 5. The HTTP interpreter 401 is configured to continually examine an internet port in order to detect the arrival of a URL. A question is asked at step 501 as to whether a URL has been received and if answered in the affirmative a question is asked at step 502 as to whether the URL is valid. If either of the questions asked at steps 501 and 502 are answered in the negative, control is returned to step 501 and the system continues to wait for received URLs.

If the question asked at step 502 is answered in the affirmative, to the effect that a valid URL has been received, embedded JAVA code is supplied back to the requesting user effectively supplying the JAVA platform to the user, as identified at step 503. This JAVA platform is generated by the JAVA interpreter 402, whereafter a connection to the database computer 110 is established over the ethernet 403.

Thereafter, as identified at step 504, the database metadata is supplied to the user from the networking store 405 illustrated by link 411 in FIG. 4. Upon receiving the metadata, the local user is now in a position to make the database requests supplied to the network computer via appropriate URLs. At step 505 the system waits for database instructions and asks a question as to whether a database instruction has been received. If answered in the affirmative, a question is asked at step 506 as to whether the instruction is valid and if either of the questions asked at step 505 or step 506 is answered in the negative, control is returned to step 505.

If a valid database instruction is identified at step 506, a PERL program from the PERL program store 408 is selected at step 507 and at step 508 the selected PERL program is executed by the PERL interpreter 409 to generate an SQL enquiry.

The SQL enquiry is processed by the SQL processor 410 and as new mappings are defined, the mapping store 408 is updated at step 509.

At step 510 the SQL enquiry is executed by the SQL processor 410 and database results are returned, via the SQL processor 410 to the JAVA interface 404, indicated by link 412 in FIG. 4.

The results from the database enquiry are supplied over the ethernet 403 to the JAVA interpreter 402 and are then supplied to the HTTP interpreter 401, resulting in an HTML page being issued at step 512. Thereafter, control is returned to step 505 in anticipation of further database instructions being received.

Figure 6:
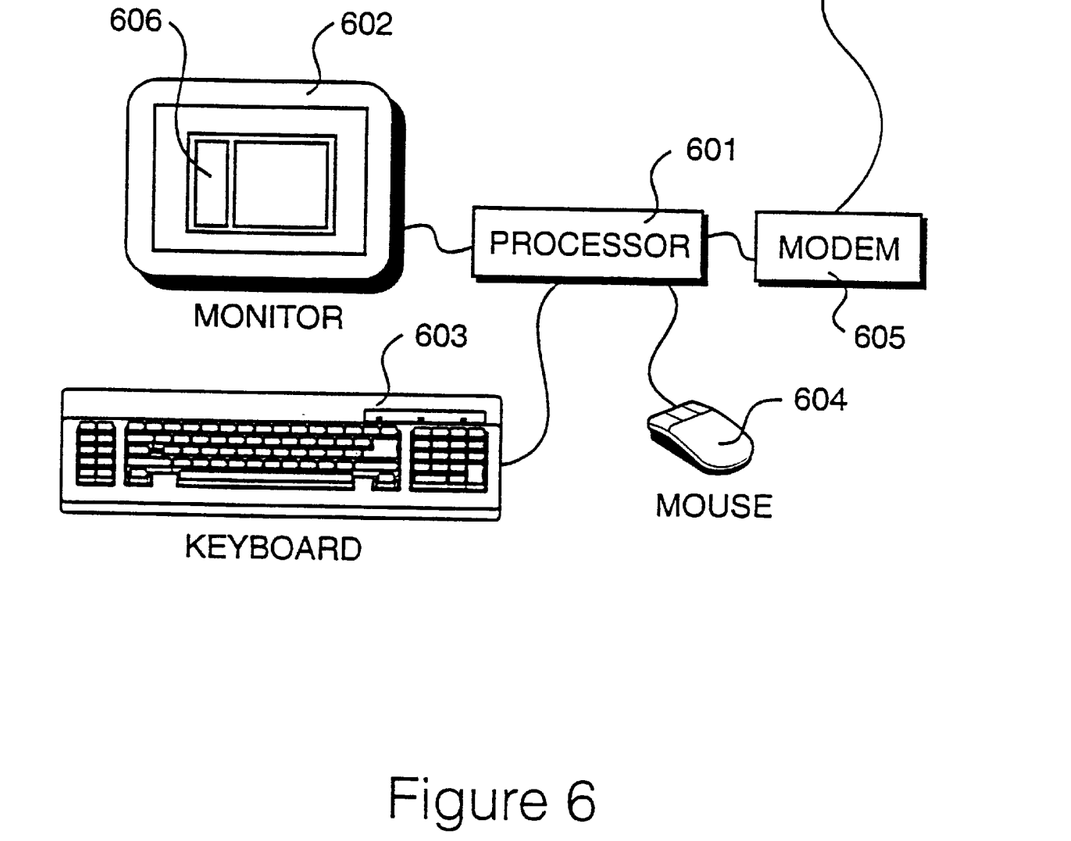
FIG. 6 illustrates an accessing computer of the type shown in FIG. 1, including a processor for executing application programs received from the network and a monitor for displaying information in response to these application programs.

A local user terminal 112 is detailed in FIG. 6. The user terminal, typically comprising a SUN work station, has a processor 601, a monitor 602, a keyboard 603 and a mouse 604. The processor 601 accesses the world wide web via modem 605. When a connection is established to the remote database, JAVA code is returned to the processor 601 via the modem 605, resulting in a graphical user interface 606 being displayed on the monitor 602. The user communicates via the graphical user interface by operation of the mouse 604. Conventional techniques of dragging, clicking and selecting soft buttons result in the generation of appropriate URLs generated in response to the meta-data received from the mapping store 408.

The information contained in the database, as illustrated by the tables shown in FIGS. 3A, 3B, 3C and 3D may be considered as representing names of quantifiable values. The environment provided by the graphical user interface 606 effectively allows particular types of queries to be executed upon the remote database. By restraining the number of operations that can be performed on the database, the actual steps involved by an operator in order to gain access are substantially simplified and made much more intuitive.

The actual query programs are generated at the remote platform and an environment is created, via the world wide web, allowing different databases to be accessed in a similar way. Furthermore, links to databases may be established, particularly via the URL mechanism, implementing a stored program at the remote location, such that the access to data is effectively extended outside the local data environment. This may be likened to making a comparison between standard flat text files and files containing hyper-links to other files accessible via a wide area network. Thus, in the same way as files with links have been referred to as "hyper-text" a database environment with links to other databases, presented in a substantially transparent way as provided by the present embodiment, may be referred to as "hyper-data".

Figure 7:
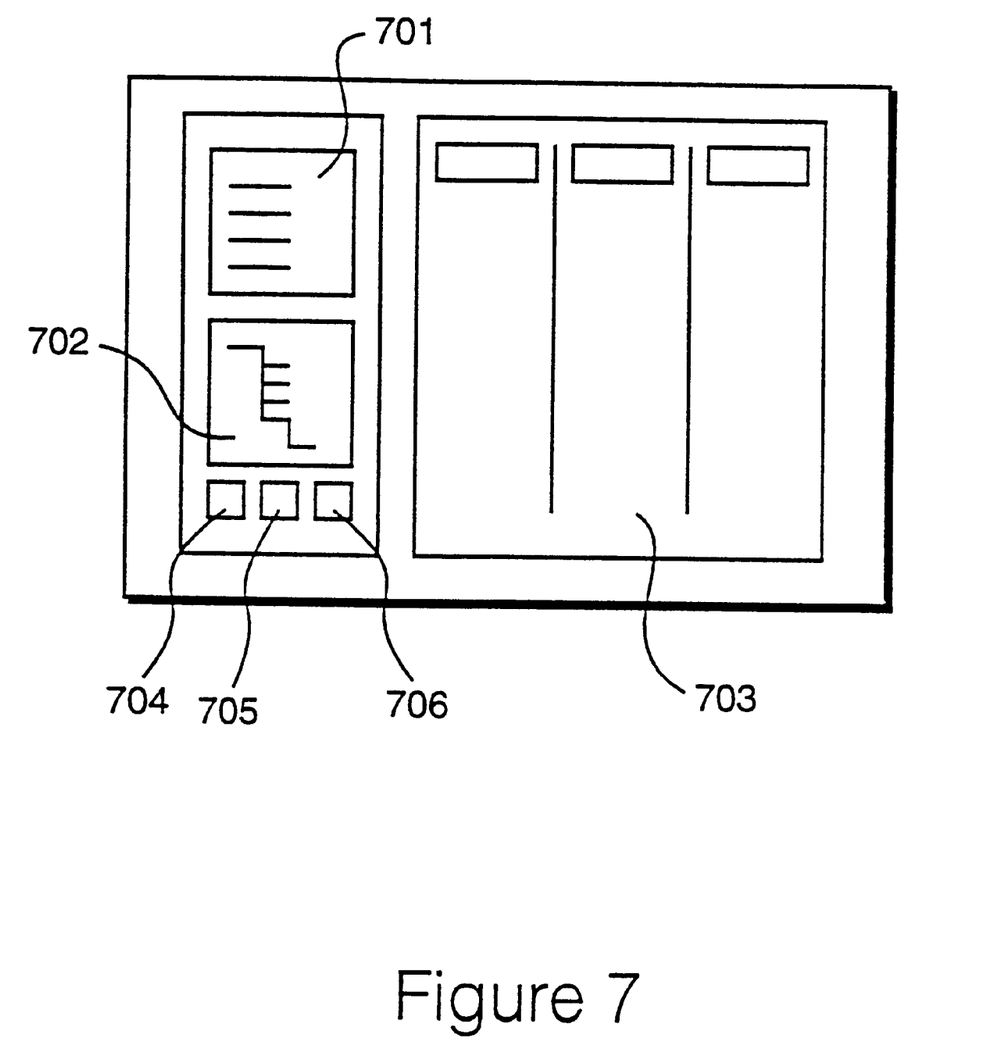
FIG. 7 illustrates a graphical user interface displayed by the display device shown in FIG. 5, including fields for specifying data requests and fields for displaying information received from the remote database.

The graphical user interface 606 is detailed in FIG. 7. Clearly the exact nature of the graphical user interface will change as operations are perform and it should be understood that the representation shown in FIG. 7 reflects an example of an interaction with the database; although similar interactions would take on a similar topology within the graphical user interface (GUI) environment.

The environment itself allows queries to be made to remote databases in situations where a quantifiable value is to be examined. Thus, referring to the example described previously, quantifiable values of this type include the advertising expenditure and the associated product sales. Within the user interface as shown in FIG. 7, accessible quantifiable values are displayed in a value display region 701. The actual values displayed will depend upon the nature of the information available from the database.

The nature of databases is such that values are accumulated for a very large number of specific entries. Thus, as illustrated in FIG. 3B, the total sales recorded in column 304 results from the summation of a very large number of individual sales identified by specific customer identifications, as listed in column 303. Thus, it is possible to consider unit sales on a customer by customer basis. Alternatively, by relating to the table illustrated in FIG. 3C, it is possible to consider the sales information on a city by city basis. Similarly, with further relation to the table illustrated in FIG. 3D, it is possible to consider the sales values on a region by region basis. These different ways of identifying what is essentially the same data, are referred to as dimensions. Thus, the value of sales may be considered within the dimension of customers, within the dimension of cities or within the dimension of regions. The available dimensions are illustrated in a dimension display region 702. The results obtained from viewing a selected value within a selected dimension are displayed within a data grid 703. The GUI is completed by a plurality of soft buttons 704, 705 and 706.

Figure 8A:
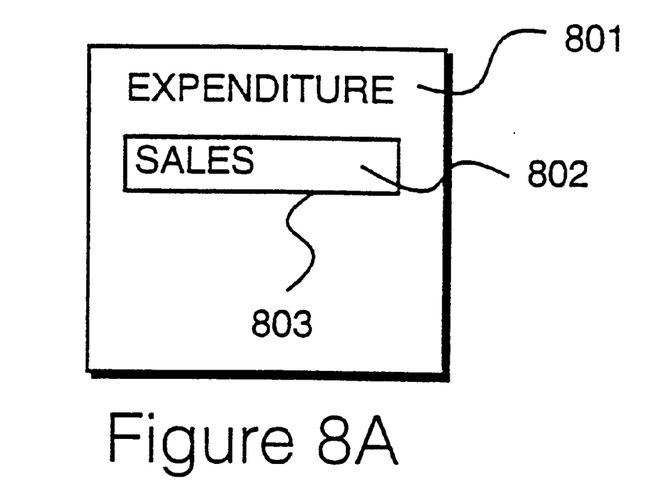
FIGS. 8a and 8b illustrate displays arranged to receive user instructions as shown in FIG. 7

The value display region 701 is detailed in FIG. 8A for a typical session involving the data identified in FIGS. 3A, 3B, 3C and 3D. From this data, it is possible to examine values for expenditure and for sales. These values may be identified by a single mouse click and a double mouse click is used to effect queries in relation to the particular selected values. In FIG. 8A it is possible to select the expenditure value identified at 801 or, alternatively, to select the sales value indicated at 802. In the Figure, a box 803 is shown around the sales value 802, indicating that the sales value has been selected by a double mouse click.

Figure 8B:
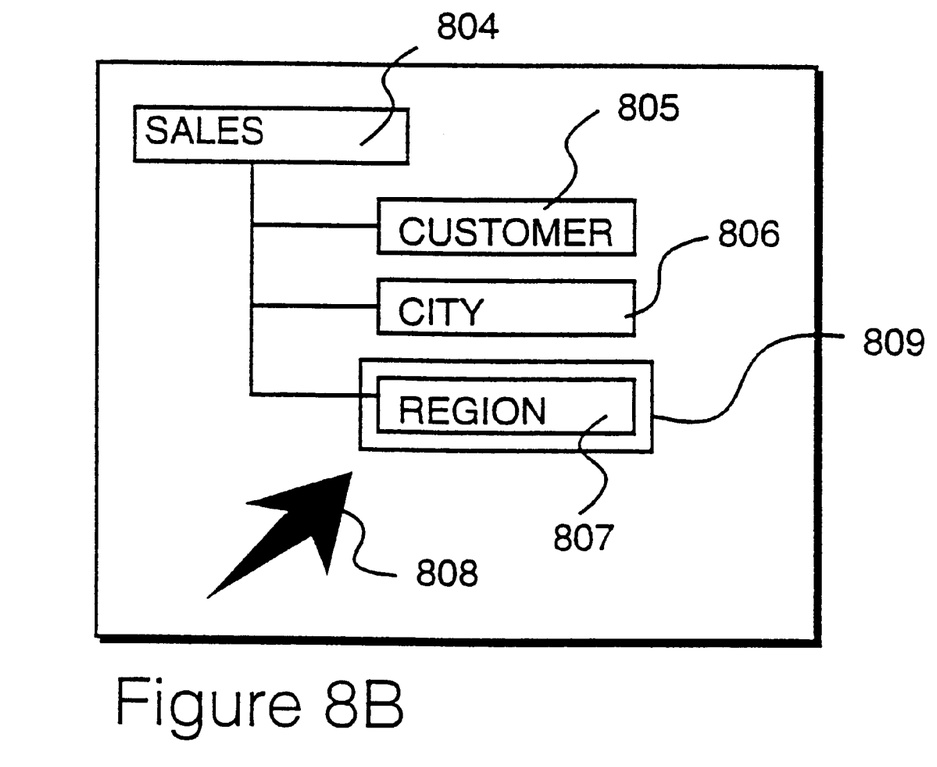

The dimension display region 702 is detailed in FIG. 8B. In response to the sales value 802 being selected, the sales value is displayed in the dimension display region within a value box 804. Extending from this box three available dimensions are displayed consisting of the customer dimension displayed in a box 805, the city dimension displayed in a box 806 and the region dimension displayed within a box 807. The operator, in this example, is interested in viewing sales on a region by region basis, so that these regional sales may be compared against regional advertising expenditure. The operator therefore moves the displayed cursor, shown as arrow 808, over box 807 and effects a double mouse click, thereby selecting this dimension. In FIG. 8B the selection of dimension 807 has been identified by the outer box 809 positioned around the inner box 807.

Figure 9:
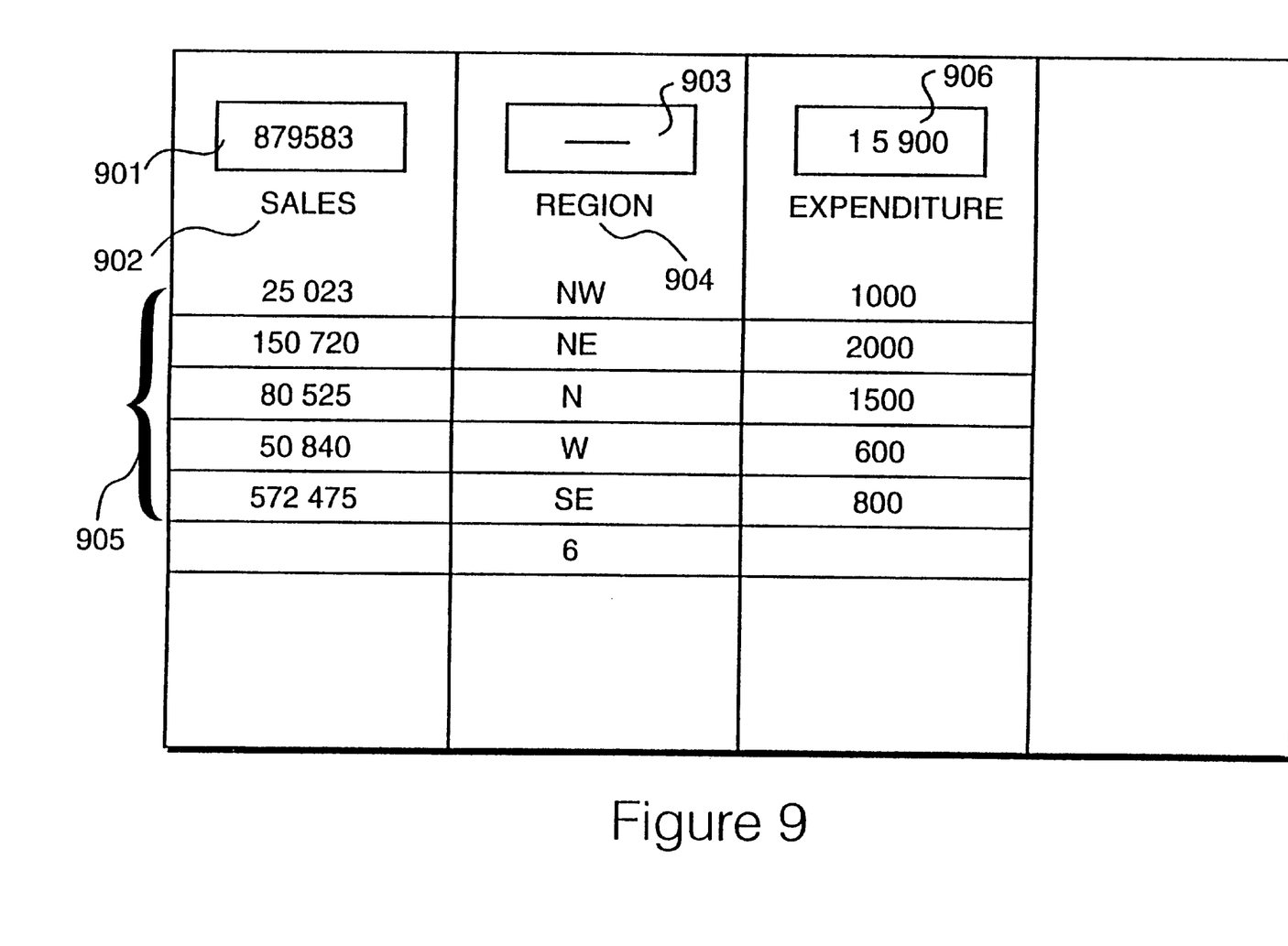
FIG. 9 illustrates the data display identified in FIG. 7.

After selecting the region dimension by double clicking on box 809 a query, represented in accordance with the JAVA protocol, is supplied to the remote database resulting in SQL queries being generated and indications supplied to the mapping store 408 identifying a selection of the sales value and the region dimension. After selecting the sales value, a figure representing the total sales is derived from the database and returned to the local user such that the information is displayed in display box 901 of the data grid shown in FIG. 9. In addition, the selected value name "Sales" is displayed at 902 beneath the value box 901.

Upon selecting the dimension for geographical region, data is supplied to the remote database resulting in an SQL query being generated from information read from the mapping store 408. Thus, information received from the user identifies the dimension "Region" with the value "Sales" being derived from the mapping store 408 This results in a suitable SQL enquiry being generated such that sales values are obtained on a region by region basis. In the data grid shown in FIG. 9, an empty value 903 is displayed given that the dimension does not have numerical value, and beneath this box an identification of the dimension "Region" is displayed at 904. Beneath this the particular region names are displayed as "NW", "NE", "N", "W" and "SE". Furthermore, the sales total is then broken down to individual values 905 which are shown underneath the legend "Sales" mapped onto the geographical region identifications displayed under the legend "Region".

Thus, in response to simple manual operations within the value display region and the dimension display region, the database has been interrogated in order to provide dimension data showing sales on a region by region basis. In the example shown in FIG. 9, the total sales expenditure, displayed in a value box 906, has also been broken down on a region by region basis with data derived from another database connected to the network. This data is obtained by selecting the "Expenditure" value displayed in the value display region 701. Again a further selection is made for the dimension region, resulting in the required mapping of advertising expenditure to resulting sales on a region by region basis.

What is claimed is:

1. A method of producing output data from a database system in response to instructions from distributed user terminals, said method comprising steps of
    establishing a communications channel between a user terminal and said database system, wherein said database system includes a plurality of independent databases having a plurality of database schemas;
    supplying data from said database system to said connected user terminal to identify available relational data queries corresponding to pre-determined data mappings between said independent databases;
    returning data to said database system identifying a selected relational data query from said available selection; and
    implementing said selected query to produce output data from said database system.

2. A method as in claim 1, wherein said selected query is defined in accordance with Standard Query Language (SQL) instructions.

3. A method as in claim 2, wherein said SQL is generated by the execution of a pre-defined script.

4. A method as in claim 1, wherein a user interface environment is established in response to commands returned from the database system.

5. A method as in claim 1, wherein the database system supplies indications of available quantifiable values.

6. A method as in claim 5, wherein a selection of a value is made by a user, resulting in an indication of said selected value being returned to the database system.

7. A method as in claim 6, wherein the database system is arranged to return details of available dimensions in response to a selected value.

8. A method as in claim 7, wherein the database system retains a record of user selections.

9. A method as in claim 8, wherein database queries are made in response to user instructions and said record of previous user selections.

10. A database system configured to produce output data in response to instructions from distributed user terminals, said system comprising:
    a plurality of independent databases having a plurality of database schemas;
    means for establishing a communication channel with a user terminal;
    means for supplying data to said connected user terminal to identify available relational data queries corresponding to pre-determined data mappings between said independent databases;
    means for receiving data identifying a selected relational data query from said available selection; and
    means for implementing said selected query to produce output data from the database system.

11. A database system as in claim 10, wherein said means for implementing said selected query is configured to supply Standard Query Language (SQL) instructions to the database system.

12. A database system as in claim 11, wherein said SQL instructions are generated by the execution of a predefined script.

13. A database system as in claim 10, including means for establishing a user interface environment in response to commands returned from the database system.

14. A database system as in claim 10, wherein the database system includes means for supplying indications of available quantifiable values.

15. A database system as in claim 14, including means for returning an indication of a selected value to the database, in response to a selection being made by a user.

16. A database system as in claim 15, wherein said database system includes means for returning details of available dimensions in response to a selection made by a user.

17. A database system as in claim 16, wherein the database system includes means for retaining a record of user selections.

18. A database system as in claim 17, including means for effecting database queries in response to user instructions and said record of previous user selections.

* * * * *